C. W. HOWLAND.
LENS DRILLING MACHINE.
APPLICATION FILED AUG. 16, 1906.

979,007.

Patented Dec. 20, 1910.
2 SHEETS—SHEET 1.

Witnesses:
H. E. Chase
F. C. Thomas

Inventor
C. W. Howland
By Howard P. Denison
Atty

C. W. HOWLAND.
LENS DRILLING MACHINE.
APPLICATION FILED AUG. 16, 1906.
979,007.
Patented Dec. 20, 1910.
2 SHEETS—SHEET 2.
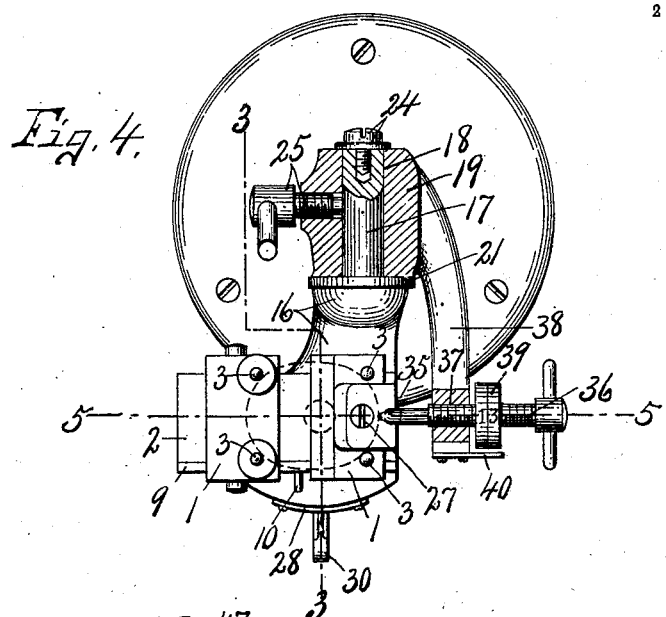
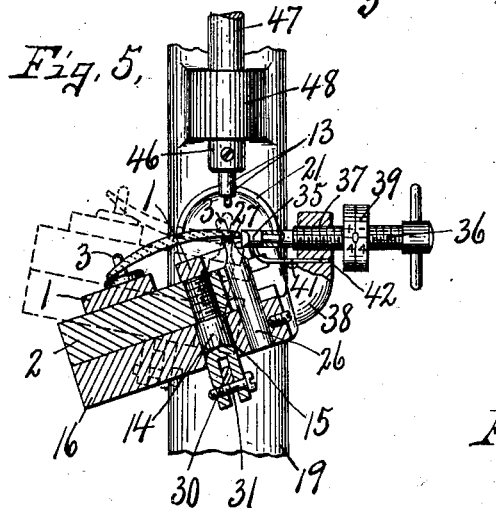
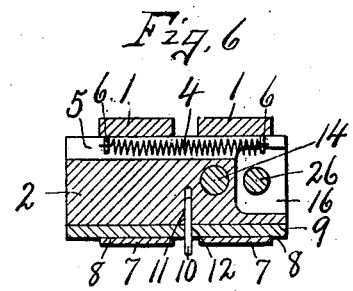
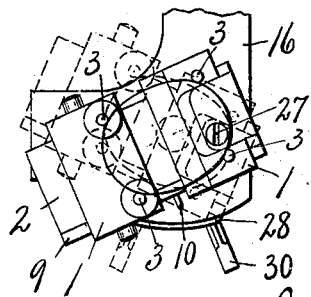

UNITED STATES PATENT OFFICE.

CHAUNCEY W. HOWLAND, OF GENEVA, NEW YORK, ASSIGNOR TO THE STANDARD OPTICAL COMPANY, OF GENEVA, NEW YORK, A CORPORATION OF NEW YORK.

LENS-DRILLING MACHINE.

979,007.　　　　　Specification of Letters Patent.　　Patented Dec. 20, 1910.

Application filed August 16, 1906. Serial No. 330,798.

*To all whom it may concern:*

Be it known that I, CHAUNCEY W. HOWLAND, of Geneva, in the county of Ontario, in the State of New York, have invented new and useful Improvements in Lens-Drilling Machines, of which the following, taken in connection with the accompanying drawings, is a full, clear, and exact description.

This invention relates to improvements in lens drilling machines for drilling screw holes in either plain, toric, or meniscus lenses.

My main object is to support the lens in a horizontal position or at an angle above or beneath the horizontal plane, or rather at different angles with reference to the axis of the drill so that the drill may enter the plain, convex or concave surface of the lens at substantially right angles thereto. In other words, I have sought to provide a lens-holder which is tiltable to different angles relatively to the axis of the drill and also adapted to swing horizontally upon a vertical axis to drill the lens in line with its mechanical axis, or at either side thereof.

A further object is to locate the lens bearing in vertical alinement with the axis of the drill and in horizontal alinement with the swinging axis of the lens holder so that said bearing always remains at the intersection of said axes no matter what position the lens-holder may be made to assume.

Other objects and uses will appear in the following description.

Figure 1:
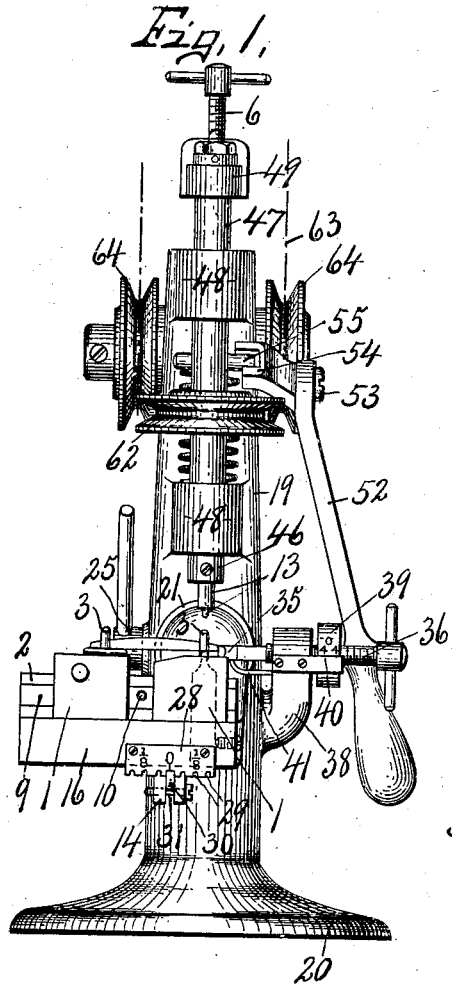
Figure 2:
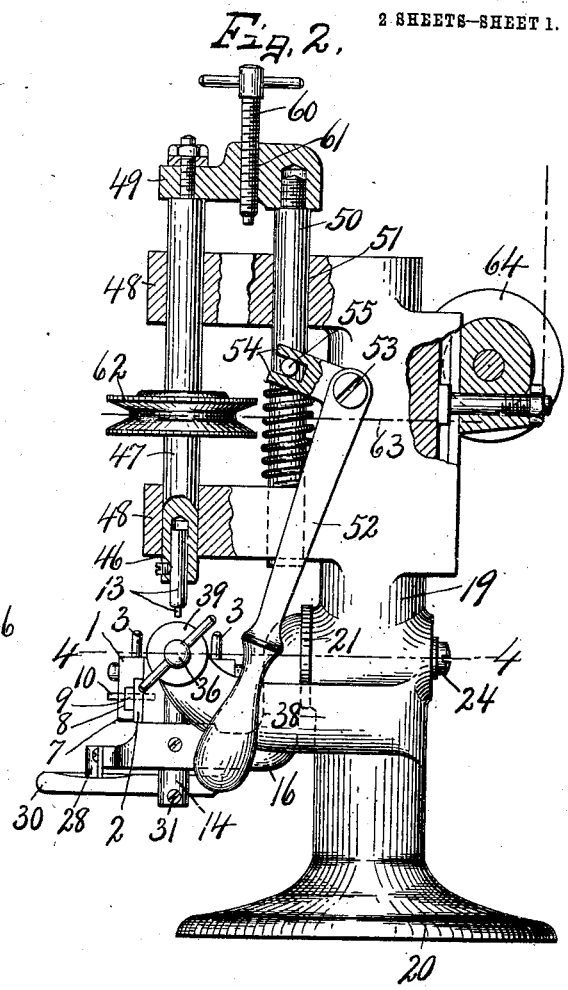

In the drawings—Figures 1 and 2 are respectively front and side elevations of a lens drilling machine embodying the various features of my invention, portions of the machine being shown in section in Fig. 2. Figs. 3, 4, 5, and 6 are sectional views taken respectively on lines 3—3, Fig. 4; 4—4 Fig. 2; 5—5, Fig. 4, and 6—6, Fig. 3. Fig. 7 is a top plan of the lens holder and adjacent portion of the swinging bracket upon which it is mounted, said lens holder being shown by full lines as swung to one of its extreme positions, and by dotted lines in its other extreme position.

The lens holder consists essentially of a pair of sliding jaws or blocks —1— which are mounted upon and are movable along a bed-plate or guide —2— and are each provided with a pair of pins —3— for engaging the edges of the lens and centering the lens upon the upper faces of the blocks —1—. These jaws or sliding blocks —1— are spring-operated toward each other by coil spring —4— which is located in lengthwise groove —5— in one side of the bed-plate —2— and has its opposite ends connected to suitable pins —6— also playing in the slot —5—.

The lower sides of the blocks —1— are recessed to receive the bed-plate —2— forming depending flanges —7— each of which engage with the opposite longitudinal edges of said bed piece, while the upper portions of the blocks rest upon the top face of said bed piece. One of these flanges opposite the groove —5— is formed with a longitudinal groove —8— for receiving a guide-bar —9— which is locked against endwise movement to the bed-piece —2— by a key or pin —10—, best seen in Fig. 6. This key enters alined apertures —11— and —12— in the bed-piece —2— and bar —9— respectively, and while it serves to lock the bar —9— to the bed-piece —2—, the said bar 9 entering the recess —8— operates to hold the jaws or sliding blocks —1— against upward displacement.

If it is desired to remove the lens holder consisting of the blocks —1—, the key —10— may be readily withdrawn to release the bar —9— and thereby permit the sliding blocks or jaws —1— to be removed endwise from the bed-piece 2. This bed-piece —2— and lens holder mounted thereon are adapted to be swung horizontally and vertically, the horizontal swinging movement being accomplished by providing said bed-piece with a depending stud —14— which is journaled in a suitable aperture —15— in a swinging bracket —16— wholly at one side of the axis of the drill to afford a clear open space for the manipulation of the lens in its clamps.

The vertical swinging movement is accomplished by providing the bracket —16— with a horizontally projecting stud —17— which is journaled in a bearing —18— in an upright standard —19— also wholly at one side of the axis of the drill, said standard having a base —20— adapted to be secured to any available support, not shown. This bracket is provided with a flange —21— concentric with its swinging axis and having graduations —22— adapted to register with a fixed mark or indicator —23— on the standard —19— so that the degree of tilting movement above and beneath the horizontal position may be readily apparent. This bracket is prevented from axial movement by the flange —21— engaging one side of the standard —19— and a cap screw —24— which engages the opposite side of said standard, said bracket being held in its adjusted position by a suitable set screw —25— in the standard —19—.

The vertically swinging bracket —16— is provided with a horizontal forwardly projecting ledge some distance below its swinging axis, and upon this ledge is secured a lens-supporting post —26— having a comparatively narrow rounded lens bearing face —27— coincident with the vertical axis of the drill, as —13—, and also coincident with the horizontal swinging axis of the bracket —16— so that this lens bearing is located at the intersection of said axes and, therefore, always maintains a position in line with the drill no matter what position the lens holders may assume, either in the vertical tilting of the bracket —16— or horizontal swinging movement of the bed-piece —2— and lens holder mounted thereon.

Figure 3:
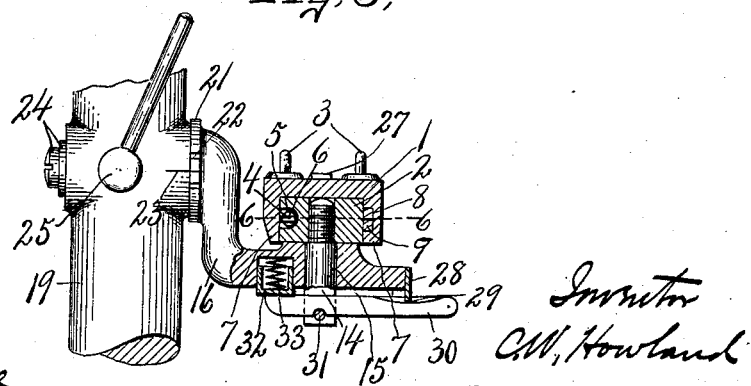

The front face of the forwardly projecting ledge of the bracket —16— is provided with an index plate —28— concentric with the stud —14— or vertical swinging axis of the bed-piece —2—, said index plate being provided on its lower edge with notches —29— adapted to be engaged by a lever —30— which is fulcrumed at —31— to the lower end of the stud —14— and is spring pressed into the notches —29— by a suitable plunger —32— and spring —33—, best seen in Fig. 3, the purpose of the lever —30— and notches —29— being to hold the bed-piece —2— and lens holder in its horizontally-adjusted position; as for instance, when it is desired to drill a screw hole through the lens on the long diameter or at either side of the same.

As previously stated, the drill holding blocks —1— are spring pressed toward each other and are movable along the bed plate —2— to bring the edge of the lens against a limiting stop or gage —35—. This limiting stop or gage is disposed in the horizontal plane of the lens at one side of the lens bearing —27— and is preferably formed upon one end of a screw —36— which is screwed in a threaded aperture —37— of an arm —38— on the standard —19— and is provided with an annulus —39— having suitable plus and minus graduations upon its periphery adapted to register with an index plate —40—, as best seen in Fig. 1 to indicate the position of the limiting stop —35— with reference to the vertical axis of the drill so that by adjusting the screw —36— and bringing the edge of the lens against the stop —35— the lens may be drilled a predetermined distance from its edge indicated by the graduations upon the annulus —39—.

The limiting stop —35— preferably has a narrow contact face for the edge of the lens and is usually journaled in the adjacent end of the screw —36— and provided with a guide-finger —41— which enters an aperture —42— in the arm —38— to hold the limiting stop against rotation during the adjustment of the screw, thereby maintaining the narrow contact face of said limiting stop in the same upright position.

The drill —13— is secured in a suitable chuck —46— of an upright rotary shaft —47—, the latter being journaled in suitable bearings —48— forming a part of the standard —19—. The upper end of the shaft —47— is reduced and journaled in a vertically movable head or yoke —49— which connects the shaft to a vertically sliding rod —50—. This rod is guided in vertically alined apertures, as —51—, in the arms —48— of the standard —19— together with the shaft —47—, to which it is yoked; is reciprocated vertically by means of a lever —52— which is fulcrumed at —53— upon the standard —19— and is provided with a furcated offset —54— which engages a pin or stud —55— on the vertically sliding bar or rod —50—.

The degree of vertical movement of the drill and its supporting shaft is limited by an adjustable stop consisting of a screw —60— which enters a threaded aperture —61— in the yoke —49— and is adapted to engage the top face of the upper arm —48—, the purpose of this adjustment being to allow the drill to enter substantially half way through the lens from one side, whereupon the lens may be inverted and drilled the other half way through from the opposite side.

The drill spindle or shaft —47— may be rotated by any available power and for this purpose is provided with a pulley —62— for receiving the belt —63— which is passed around suitable idlers —64— and adapted to be connected to any source of power, not shown.

In operation, assuming that it is desired to drill an ordinary or plain lens—then the bracket —16— is swung to a substantially horizontal position, or until the center graduation on the flange —21— is registered with a fixed index mark —23—, whereupon said bracket is clamped in its adjusted position by the set-screw —25—; the lens is placed by hand, between the opposite pairs of pins —3— of the holding jaws —1— and the stop —35— is adjusted to engage and stop the edge of the lens a predetermined distance at one side of the axis of the drill —13—.

The bed-plate —2— and its lens holders —1— are normally adjusted so that the pins —3— center the lens, or rather, bring its mechanical axis or long diameter in coincidence with the axis of the adjusting screw —36— and stop —35—, but if it is desired to drill the screw hole at one side or the other of said mechanical axis or long diameter, the operator simply disengages the lever —30— from the center notch marked zero against the action of the spring —33— and then moves said lever laterally to the desired degree around the index plate —28—, thereby producing a corresponding movement of the bed-plate —2— and lens holder —1—.

When the lens holder and lens thereon are brought to the desired position to be drilled the operator rocks the lower end of the lever —52— rearwardly, thereby causing the depression of the drill —13— into engagement with the lens, the stop —60— being adjusted to stop the downward movement of the drill when the latter has entered substantially half way through the lens, whereupon the lens is removed and reinserted in an inverted position in the holder, the lever —30— is adjusted to the opposite side of zero mark on the plate —28—, and the operation of the lever —52— repeated to drill through the remaining half of the lens.

In drilling toric or meniscus lenses in which one side is convex and the other side concave and of different curvature it becomes necessary to adjust the lens holder so that the portion thereof in alinement with the drill, is at right angles to the axis of said drill and this adjustment is effected by tilting the bracket —16— upon its swinging axis until the upper face of the lens directly under the drill is at right angles to the axis of said drill, while the lower face of said lens rests upon the bearing —27— also in vertical alinement with the axis of the drill, so that when the drill is moved downwardly by the lever —52— in the manner previously described, the screw hole is drilled substantially half way through the lens as determined by the limiting stop —60—, whereupon the lens is removed and reinserted in an inverted position in the lens holder and the latter is again adjusted so as to bring the upper face of the lens directly under the drill at right angles with the axis of said drill, whereupon the drill is again depressed to complete the hole through the lens.

What I claim is:

1. In a lens drilling machine, a rotary drill-spindle, a bracket adjustable rotarily about an axis at right angles to and intersecting that of the spindle, a lens bearing on the bracket located at the intersection of said axes, means for indicating the degree of such adjustment, a bed piece mounted upon a bracket and adjustable rotarily about an axis wholly at one side of the first named axes, and a lens clamping device mounted upon the bed piece.

2. In a lens drilling machine, a rotary drill-spindle, a rotarily adjustable bracket having its axis intersecting that of the drill-spindle, said bracket being provided with a lens bearing located at the intersection of said axes, and a lens clamping device adjustable rotarily with said bracket and having an independent rotary and sliding adjustment relatively to the lens bearing.

3. In a lens drilling machine, a rotary drill-spindle, a rotarily adjustable bracket having its axis intersecting that of the drill-spindle, said bracket being provided with a lens bearing located at the intersection of said axis, a lens clamping device adjustable rotarily with said bracket and having an independent rotary and sliding adjustment relatively to the lens bearing and a lens-edge stop adjustable transversely of both axes in a plane of their intersection.

4. In a lens drilling machine, a rotary drill-spindle, a support tiltable to different angles, relatively to the axis of the spindle, a rotary element journaled on said support wholly at one side of its axis of movement and means mounted on said element for holding the lens.

5. In a lens drilling machine, a drill spindle the combination with a supporting standard, a bracket having one end journaled on said standard, a bed plate journaled on the other end of the bracket and having its axis wholly at one side of the swinging axis of the bracket, a lens bearing at the intersection of the axis of the spindle and bracket and a lens holder slidable upon said bed plate.

6. In a lens drilling machine, the combination with a supporting standard, a bracket having one end journaled on said standard, a bed plate journaled on the other end of the bracket and having its axis wholly at one side of the swinging axis of the bracket, a lens holder slidable upon said bed plate, and a lens bearing secured to the bed plate and having its bearing face coincident with the swinging axis of the bracket.

7. In a lens drilling machine, a standard, a swinging bracket journaled on the standard, a drill and its actuating means, a lens bearing secured to the bracket and having a bearing face at the intersection of the axis of the drill and that of the bracket, a rotatable bed plate journaled on the bracket at one side of said axes and movable independently of the lens bearing, and a lens holder slidable upon said bed plate independently of the lens bearing.

In witness whereof I have hereunto set my hand this 11th day of August 1906.

CHAUNCEY W. HOWLAND.

Witnesses:
MARY CARRON,
EDWARD S. BOYDEN.